United States Patent
Zhang et al.

(10) Patent No.: US 10,318,268 B2
(45) Date of Patent: Jun. 11, 2019

(54) SETTING METHOD FOR BINARY INTEGRATION OF BOOT PROGRAM AND KERNEL PROGRAM

(71) Applicant: ZTE Corporation, Shenzhen, Guangdong (CN)

(72) Inventors: Yaodong Zhang, Shenzhen (CN); Yantao Xu, Shenzhen (CN); Zhonglin Ding, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 1058 days.

(21) Appl. No.: 14/787,752

(22) PCT Filed: Aug. 29, 2013

(86) PCT No.: PCT/CN2013/082564
§ 371 (c)(1),
(2) Date: Nov. 30, 2015

(87) PCT Pub. No.: WO2014/075491
PCT Pub. Date: May 22, 2014

(65) Prior Publication Data
US 2016/0077823 A1    Mar. 17, 2016

(30) Foreign Application Priority Data

Nov. 19, 2012    (CN) .......................... 2012 1 0468412

(51) Int. Cl.
*G06F 9/445*    (2018.01)
*G06F 8/65*    (2018.01)
(Continued)

(52) U.S. Cl.
CPC .................. *G06F 8/65* (2013.01); *G06F 9/28* (2013.01); *G06F 8/63* (2013.01)

(58) Field of Classification Search
CPC ..................................... G06F 8/65; G06F 8/63
See application file for complete search history.

(56) References Cited

U.S. PATENT DOCUMENTS 6,640,334 B1 * 10/2003 Rasmussen ............... G06F 8/65
717/169
7,836,293 B1 * 11/2010 Wynia ................... G06F 9/4405
709/201
(Continued)

FOREIGN PATENT DOCUMENTS

| CN | 101021794 A | 8/2007 |
|---|---|---|
| CN | 101145960 A | 3/2008 |

(Continued)

OTHER PUBLICATIONS

International Search Report in international application No. PCT/CN2013/082564, dated Dec. 5, 2013.
(Continued)

*Primary Examiner* — Wei Y Zhen
*Assistant Examiner* — Brahim Bourzik
(74) *Attorney, Agent, or Firm* — Oppedahl Patent Law Firm LLC

(57) ABSTRACT

A setting method for binary integration of a Boot program and a kernel program is described, which includes that: unified configuration on configuration files of different control chips is performed, the control chips are identified according to hardware information, and code flows of different control chips are modified to implement the binary integration of the Boot program; and kernel configurations of different control chips are unified, and compiling coexistence configuration and running coexistence configuration on different control chips is performed to implement the binary integration of the kernel program. By the method of (Continued)

the disclosure, use of the same software version for two or more different control chips may be realized.

15 Claims, 6 Drawing Sheets

(51) Int. Cl.
*G06F 9/28* (2006.01)
*G06F 8/61* (2018.01)

(56) References Cited

U.S. PATENT DOCUMENTS

| | | | |
|---|---|---|---|
| 9,405,515 B1* | 8/2016 | Bertram | G06F 8/41 |
| 2004/0268107 A1* | 12/2004 | Zimmer | G06F 9/4408 |
| | | | 713/1 |
| 2008/0229069 A1* | 9/2008 | Sartorius | G06F 9/30047 |
| | | | 712/207 |
| 2009/0132816 A1 | 5/2009 | Lee | |
| 2010/0262818 A1 | 10/2010 | Lee | |
| 2011/0246759 A1* | 10/2011 | Lai | G06F 9/4401 |
| | | | 713/2 |
| 2013/0321436 A1* | 12/2013 | Hoeg | G06T 1/00 |
| | | | 345/522 |
| 2014/0068573 A1* | 3/2014 | Brewis | G06F 9/449 |
| | | | 717/140 |
| 2016/0253471 A1* | 9/2016 | Volpe | A61N 1/3968 |
| | | | 607/5 |
| 2018/0253398 A1* | 9/2018 | Wu | G06F 15/17343 |

FOREIGN PATENT DOCUMENTS

| | | |
|---|---|---|
| CN | 101309475 A | 11/2008 |
| CN | 101452437 A | 6/2009 |
| CN | 101485576 A | 7/2009 |
| CN | 102164193 A | 8/2011 |
| CN | 102279763 A | 12/2011 |
| CN | 102541572 A | 7/2012 |

OTHER PUBLICATIONS

English Translation of the Written Opinion of the International Search Authority in international application No. PCT/CN2013/082564, dated Dec. 5, 2013.

* cited by examiner

Fig. 2

| A file format of a Boot program ||
|---|---|
| Version header (256 byte) | Version number |
| | Version function (i.e. corresponding master control board type) |
| | Version type (indicating the program is a Boot program) |
| | Creation time of a version |
| | Length of the version header |
| | Size of the whole version |
| | Checksum of the version header |
| | Boot mask information |
| | Preservation information |
| Version main body (valid codes) | Boot version mirror |

SETTING METHOD FOR BINARY INTEGRATION OF BOOT PROGRAM AND KERNEL PROGRAM

TECHNICAL FIELD

The disclosure relates to the technical field of optical fibre communications, and in particular to a setting method for binary integration of a Boot program and a kernel program in an integrated access technology such as an Ethernet Passive Optical Network (EPON), a Gigabit Passive Optical Network (GPON) and a 3rd Generation (3G) wireless mobile communication technology.

BACKGROUND

At present, along with continuous growth of various communication services, an Optical Network Unit (ONU) is widely applied to optical fibre communications. Correspondingly, types of ONU control chips are gradually increased, and there may exist great differences even among different series of control chips of the same manufacturer. Each control chip corresponds to a software version during software setting, and if such a setting manner is adopted for the same product, big troubles may be brought to external field upgrading and use of users. For example: two sets and even more sets of software versions are required to be provided for the same product after two and even more control chips adopting different Advanced Risc Machine (ARM) kernels are used in sequence, which may cause low external field upgrading efficiency, more complicated upgrading method, inconvenience in use of a user and more difficulty in management.

SUMMARY

In view of this, a main purpose of an embodiment of the disclosure is to provide a setting method for binary integration of a Boot program and a kernel program, which may realize use of the same software version for two or more different control chips.

To this end, the technical solutions of the embodiment of the disclosure are implemented as follows.

An embodiment of the disclosure provides a setting method for binary integration of a Boot program and a kernel program, which includes:

performing unified configuration on configuration files of different control chips, identifying the control chips according to hardware information, and modifying code flows of different control chips to implement the binary integration of the Boot program; and unifying kernel configurations of different control chips, and performing compiling coexistence configuration and running coexistence configuration on different control chips to implement the binary integration of the kernel program.

Preferably, the performing unified configuration on configuration files of different control chips may include:

setting conflicting macros of different control chips into global variables respectively, setting conflicting items corresponding to all the macros in a control chip initialization process, and sequentially modifying locations using the conflicting items.

Preferably, the hardware information may include: General Purpose Input/Output (GPIO) interface information or processor type information.

Preferably, the performing compiling coexistence configuration may include: integrating (a) Board Support Package (BSP) code(s) of one or more control chips into a BSP of one control chip by virtue of a same set of configuration.

Preferably, the method may further include: a starting method for a binarily-integrated Boot program, which includes:

powering on a system, starting the Boot program, and acquiring types of the control chips;

judging the types of the control chips, if the control chips are Advanced Risc Machine 9 (ARM9) kernel control chips, then initializing a register of an ARM9 kernel control chip controller, and initializing peripheral hardware of the system; if the control chips are Advanced Risc Machine 11 (ARM11) kernel control chips, then initializing a register of an ARM11 kernel control chip controller, and initializing the peripheral hardware of the system;

detecting a type of a file system, and initializing the file system; and judging whether a version file on a flash is complete and valid or not, if yes, then starting a main version of the system; otherwise, returning a Boot command line to prompt that there is no valid version.

Preferably, the method may further include:

an upgrading method for a binarily-integrated Boot program, which includes: upgrading under a Boot command line and in-band upgrading, wherein the in-band upgrading includes: performing remote upgrading through a network manager after the version is started.

Preferably, the upgrading for the Boot program under the Boot command line may include:

constructing an equipment environment for upgrading the Boot program under the Boot command line; powering on and starting an Optical Network Unit (ONU), and configuring a network parameter; executing an updating command to upgrade a binarily-integrated Boot program; after the Boot program is successfully upgraded, restarting the ONU, and running a new version of the system.

Preferably, the in-band upgrading for the Boot program may include:

constructing an equipment environment for upgrading the Boot program after a version is started; powering on and starting an ONU, and configuring a network parameter; executing a Boot program upgrading command to upgrade a binarily-integrated Boot program; after the Boot program is successfully upgraded, restarting the ONU, and running a new version of the system.

Preferably, the method may further include: a starting method for a binarily-integrated kernel program, which includes:

powering on a system, starting the kernel program, and acquiring types of the control chips;

judging the types of the control chips, if the control chips are ARM9 kernel control chips, the initializing a register of an ARM9 kernel control chip controller, initializing peripheral hardware of the system, and loading a driver of external equipment related to ARM9 single boards; if the control chips are ARM11 kernel control chips, then initializing a register of an ARM11 kernel control chip controller, initializing the peripheral hardware of the system, and loading a driver of external equipment related to ARM11 single boards;

making ARM Version 6 (ARMV6) and ARM Version 4 (ARMV4) system structure codes compatible to realize running coexistence;

detecting a type of a file system, and initializing the file system; and judging whether a user-state version file on a flash is complete and valid or not, if yes, then starting a user-state version; otherwise, returning a kernel shell command line to prompt that there is no valid user-state version.

Preferably, the method may further include: an upgrading method for a binarily-integrated the kernel program, which includes: upgrading under a Boot command line and in-band upgrading.

Preferably, the upgrading for the kernel program under the Boot command line may include:

constructing an equipment environment for upgrading the kernel program under the Boot command line; powering on and starting an ONU, and configuring a network parameter; executing a version upgrading command to upgrade the binarily-integrated kernel program; after the kernel program is successfully upgraded, restarting the ONU, and running a new version of the system.

Preferably, the in-band upgrading for the kernel program may include:

constructing an equipment environment for upgrading the kernel program after a version is started; powering on and starting an ONU, and configuring a network parameter; executing a version upgrading command to upgrade the binarily-integrated kernel program; after the kernel program is successfully upgraded, restarting the ONU, and running a new version of the system.

According to the setting method for the binary integration of the Boot program and the kernel program provided by the embodiment of the disclosure, the configuration files of different control chips are subjected to unified configuration, the control chips are identified according to a processor type, and the code flows of different control chips are modified to implement the binary integration of the Boot programs; and the kernel configurations of different control chips are integrated, and compiling coexistence configuration and running coexistence configuration are performed to implement the binary integration of the kernel programs. According to the embodiment of the disclosure, the use of the same software version for two different control chips may be realized without additional hardware cost, and high transplantability is achieved.

In addition, according to the embodiment of the disclosure, in an upgrading process of the Boot program and the kernel program, one version may be upgraded to two different control chips, so that convenience is brought to external field upgrading and version management, version upgrading efficiency and stability are both greatly improved, use is facilitated, and maintenance cost of the system is lowered.

BRIEF DESCRIPTION OF THE DRAWINGS

FIG. 2 is a structure diagram of a control chip Boot program embodiment according to an embodiment of the disclosure;

DETAILED DESCRIPTION

In an embodiment of the disclosure: configuration files of two or more different control chips are subjected to unified configuration, the control chips are identified according to hardware information, and code flows of different control chips are modified to implement binary integration of a Boot program; and kernel configurations of different control chips are integrated, and compiling coexistence configuration and running coexistence configuration are performed on different control chips to implement binary integration of a kernel program.

Preferably, in another embodiment of the disclosure, the method further includes: a starting method for the binarily-integrated Boot program and a starting method for the binarily-integrated kernel program.

Preferably, in another embodiment of the disclosure, the method further includes: an upgrading method for the binarily-integrated Boot program and an upgrading method for the binarily-integrated kernel program.

The disclosure is further described below with reference to the drawings and specific embodiments in detail.

In an embodiment of the disclosure, master control boards of an ONU, i.e., control chips of the ONU, realize control and data exchange functions of an ONU system on one hand, and are responsible for managing various line cards, including online and offline processing of the line cards, version management over the line cards and the like, on the other hand. A daughter card of a Passive Optical Network (PON) is jointed with an EPON/GPON Optical Line Terminal (OLT) system through an optical splitter, and simultaneously finishes data interaction with the master control boards. A Voice Over Internet Protocol (VOIP) daughter card finishes providing multi-path VOIP access for a Plain Old Telephone Service (POTS) user; and an E1 daughter card mainly finishes switching an E1 service to the Ethernet and recovering the E1 service; and a power board mainly provides system power.

Figure 1:
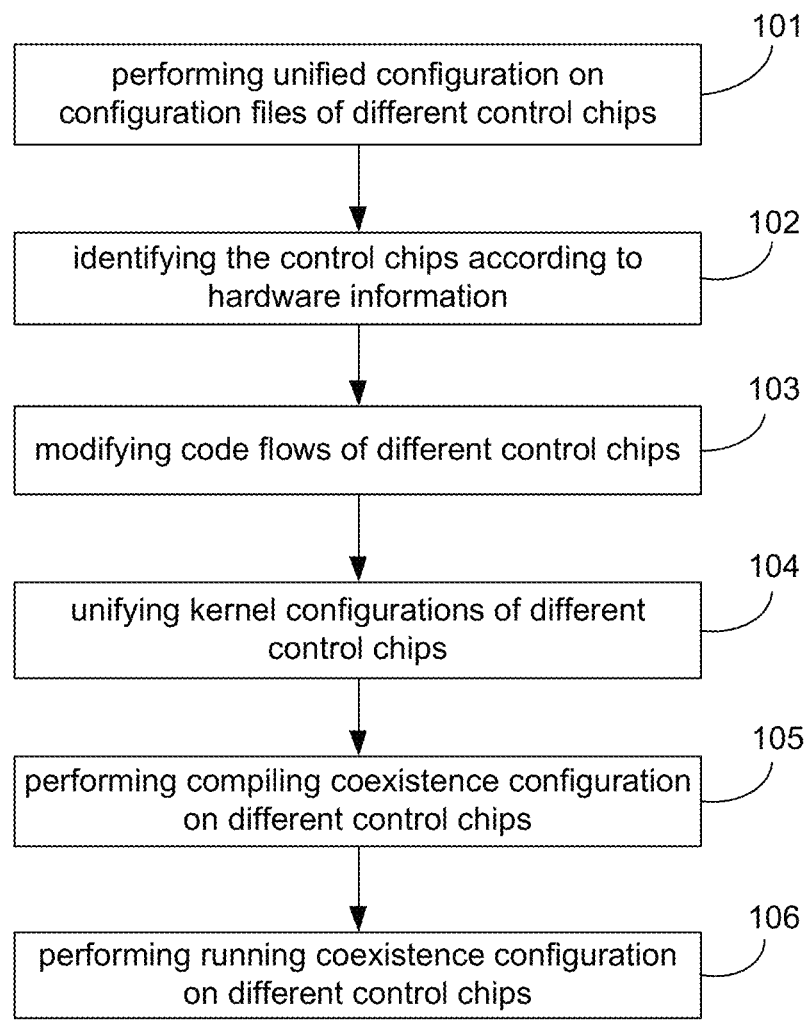
FIG. 1 is a flowchart of a setting method for binary integration of a Boot program and a kernel program according to an embodiment of the disclosure.

FIG. 1 is a flowchart of a setting method for binary integration of a Boot program and a kernel program according to an embodiment of the disclosure, as shown in FIG. 1, the flow is implemented by the following steps:

Step 101: performing unified configuration on configuration files of different control chips.

Specifically, common conflicting items for different control chips include: a memory base address, a memory size, a flash base address, a flash size, a base address of other external equipment and the like. Here, conflicting macros of different control chips are defined as global variables respectively, the conflicting items corresponding to all the macros are set in a control chip initialization process, and locations using the conflicting items are sequentially modified.

A flash configuration conflict is taken as an example, related conflicting macros are CFG_FLASH_BASE and CFG_FLASH_SIZE, the two macros are defined as global variables _g_CFG_FLASH_BASE and _g_CFG_FLASH_SIZE, and if there are other macros using CFG_FLASH_BASE and CFG_FLASH_SIZE, the macros are modified into the corresponding variable _g_CFG_FLASH_BASE or _g_CFG_FLASH_SIZE.

Step 102: identifying the control chips according to hardware information.

Specifically, specific identification manners are adopted for different control chips, the identification manners may be identified through unique hardware information of the control chips, and available hardware information includes GPIO interface information or processor type information.

An ARM-series processor is taken as an example, a register 0 of a co-processor CP15 stores related information about the processor, and a current processor may be judged whether to be an ARMS processor or an ARM11 processor through the register. Here, a type of the current processor may be detected by detecting the control chips through a design interface.

Step 103: modifying code flows of different control chips.

Specifically, the code flows of different control chips are modified, and after compiling errors produced by code integration are eliminated, an if-else structure is adopted for controlling the code flows of different control chips from initial codes after the control chips are powered on until initialization of the control chips is finished, and then an integration flow is executed.

Binary integration of the Boot program is implemented by operation in steps 101-103, and in the method of the embodiment, respective flows of the programs are controlled according to different types of the control chips mainly by virtue of instructions similar to if-else until the initialization of the control chips is finished.

FIG. 2 is a structure diagram of a control chip Boot program embodiment according to an embodiment of the disclosure, as shown in FIG. 2, including: a version header and a version main body, wherein the version header occupies 256 bytes, including: a version number, a version function, i.e., a corresponding control chip type, a version type indicating that the program is a Boot program, creation time of a version, a length of the version header, the size of the whole version, a checksum of the version header, Boot mask information and preservation information; and the version main body is a Boot version mirror, i.e., a valid code of the Boot program.

Step 104: unifying kernel configurations of different control chips.

In the step, kernel configuration items of two or more different control chips are mainly unified, and mirrors capable of running normally on different control chips may be compiled by virtue of the same set of configuration.

Step 105: performing compiling coexistence configuration on different control chips.

Here, the compiling coexistence configuration refers to: integrating (a) BSP code(s) of one or more control chips into a BSP of a control chip by virtue of the same set of configuration. Integration of ARM11 and ARM9 control chips is taken as an example, and a BSP of the ARM11 control chip is integrated into the ARM9 control chip to finish compiling.

Due to existence of more conflicting macros of different control chips and different values, all the conflicting macro definitions are integrated in a renaming manner; related codes of the control chips are distinguished by different control chip directories; drive codes are also distinguished, wherein each control chip may share a universal driver; and peculiar drivers of some control chips are only used for the control chips.

All modules of all the control chips are loaded, the type of the processor is judged at first during module loading and unloading, and if it is not the modules of the corresponding control chips, directly return; and thus, confusion the initial codes and drive codes of the control chips is avoided in a subsequent execution process.

Step 106: performing running coexistence configuration on different control chips.

Here, running coexistence is the key of binary integration debugging, and the main point is unification of instructions of processors in different versions. For a processor with the same architecture, a high version may usually be compatible with instructions of a low version, so that codes including instructions of the high version may be extracted, and the codes are compiled by the instructions of the high version.

Here, unification of ARM11 and ARM9 is taken as an example, ARMV6 and ARMV4 are both required to be configured, and codes of ARMV6 are compiled by instructions of ARMV6.

By such processing, a kernel may simultaneously support processors in different versions. After the binary integration setting of the kernel program, a binarily-integrated version of the system is compiled by the kernel program and a user-state code.

Binary integration of the kernel program is finished by operation in steps 104-106, and because processor types of different control chips are different, some extended instructions and codes controlled by different macros are involved; and therefore, the binary integration of the kernel program is relatively complicated, but the basic thought is similar to that of the Boot program.

Of course, the processes are all finished before the system is started, and the operation in steps 101-103 may be exchanged with operation in steps 104-106.

Figure 3:
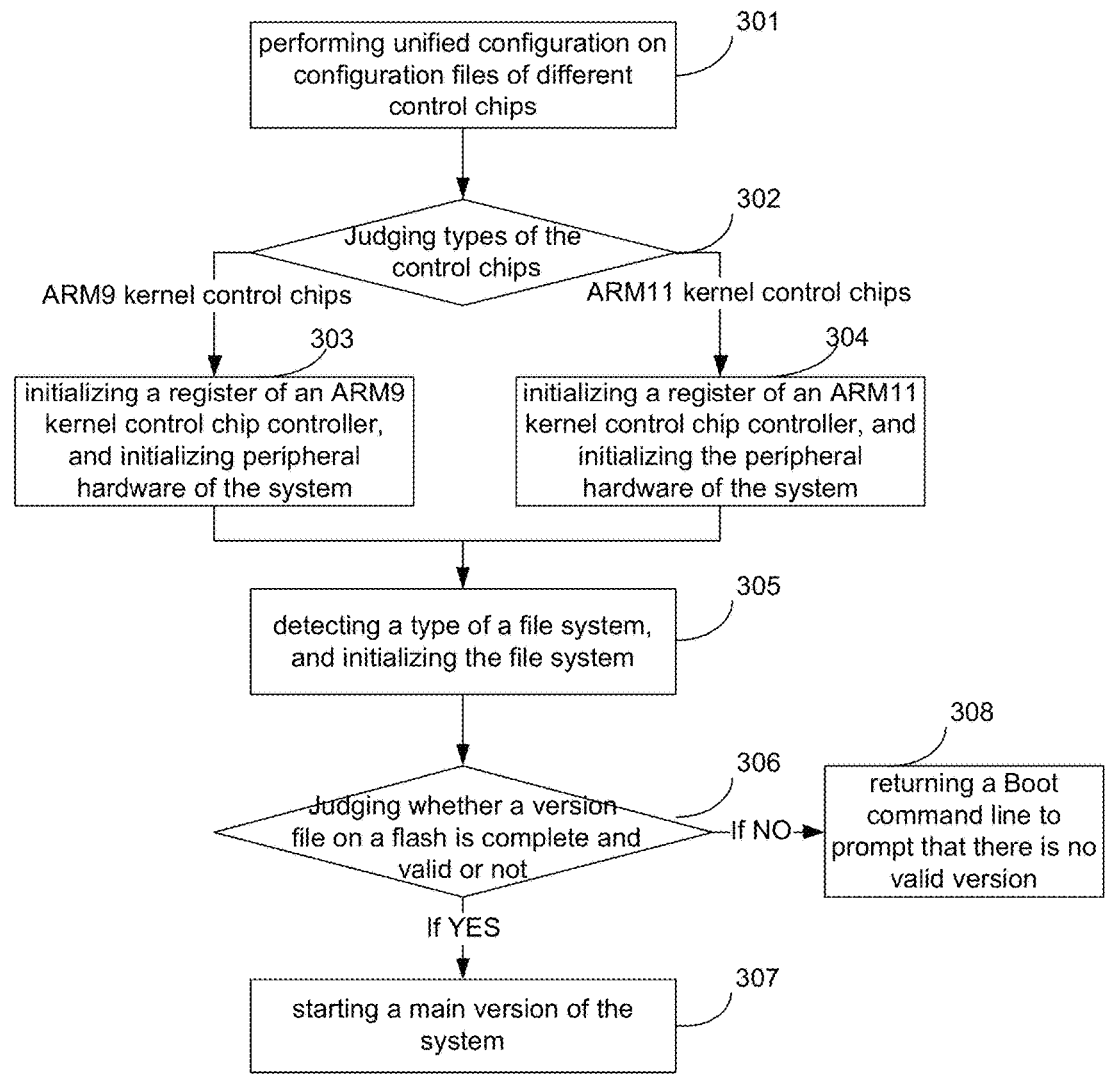
FIG. 3 is an implementation flowchart of a starting method for a Boot program according to an embodiment of the disclosure.

An embodiment of the disclosure further provides a starting method for a Boot program, as shown in FIG. 3, the method is implemented by the following steps:

Step 301: powering on a system, starting a Boot program, and acquiring types of control chips;

Step 302: judging the types of the control chips, if the control chips are ARM9 kernel control chips, executing step 303, and if the control chips are ARM11 kernel control chips, executing step 304;

Step 303: initializing a register of an ARM9 kernel control chip controller, initializing peripheral hardware of the system, and executing step 305;

wherein the peripheral hardware includes: equipment such as a memory, a flash, a network port and a serial port;

Step 304: initializing a register of an ARM11 kernel control chip controller, and initializing peripheral hardware of the system;

wherein the peripheral equipment includes: equipment such as a memory, a flash, a network port and a serial port;

Step 305: detecting a type of a file system, namely: detecting the type of the file system on the flash, and initializing the file system;

Step 306: judging whether a version file on the flash is complete and valid or not, mainly checking a mask, size, checksum and the like of a main program, if yes, executing step 307, otherwise, turning to step 308;

Step 307: starting a main version of the system; and

Step 308: returning a Boot command line to prompt that there is no valid version.

Furthermore, an embodiment of the disclosure further includes an upgrading method for a Boot program, including: upgrading under a Boot command line and in-band upgrading, i.e., remote upgrading performed through a network manager after the version is started.

Figure 4:
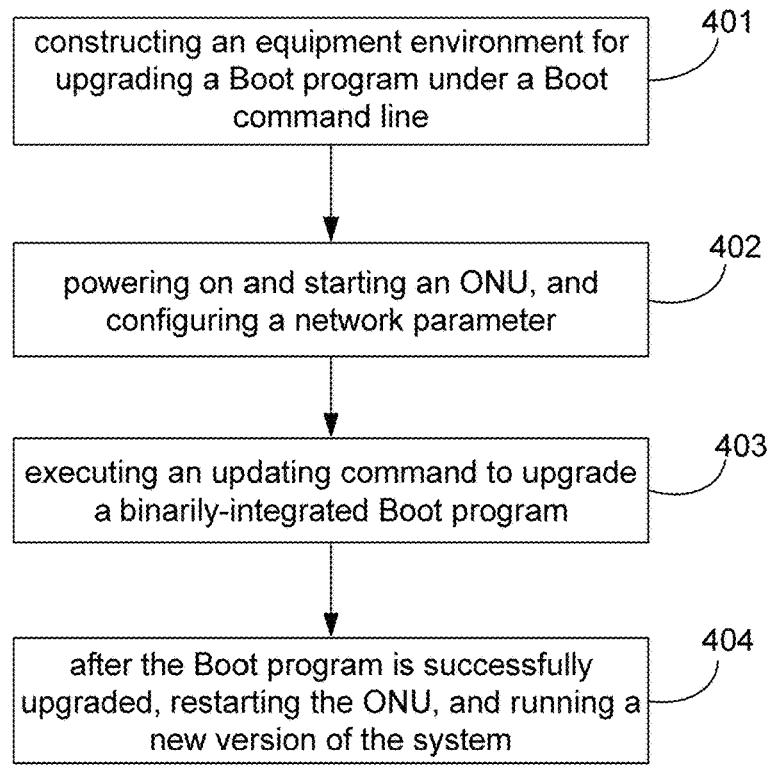
FIG. 4 is a flowchart of an upgrading method for a Boot program under a Boot command line according to an embodiment of the disclosure.

FIG. 4 is a flowchart of an upgrading method for a Boot program under a Boot command line according to an embodiment of the disclosure, as shown in FIG. 4, the method is implemented by the following flow:

Step 401: constructing an equipment environment for upgrading a Boot program under a Boot command line.

Specifically, an ONU is connected to a Personal Computer (PC) through a network cable and a serial port cable, a Trivial File Transfer Protocol (TFTP) client is turned on at a PC side, and the Boot program to be upgraded is prepared.

Step 402: powering on and starting an ONU, and configuring a network parameter.

Specifically, the ONU is powered on and started, an ENTER key is pressed in a Boot process to enter the Boot command line, a c command is input, and IP addresses of an ONU side and a TFTP server side are configured in the same network segment.

Step 403: executing an updating command, namely executing a Boot program upgrading command, to upgrade a binarily-integrated Boot program.

Step 404: after the Boot program is successfully upgraded, restarting the ONU, and running a new version of the system.

Figure 5:
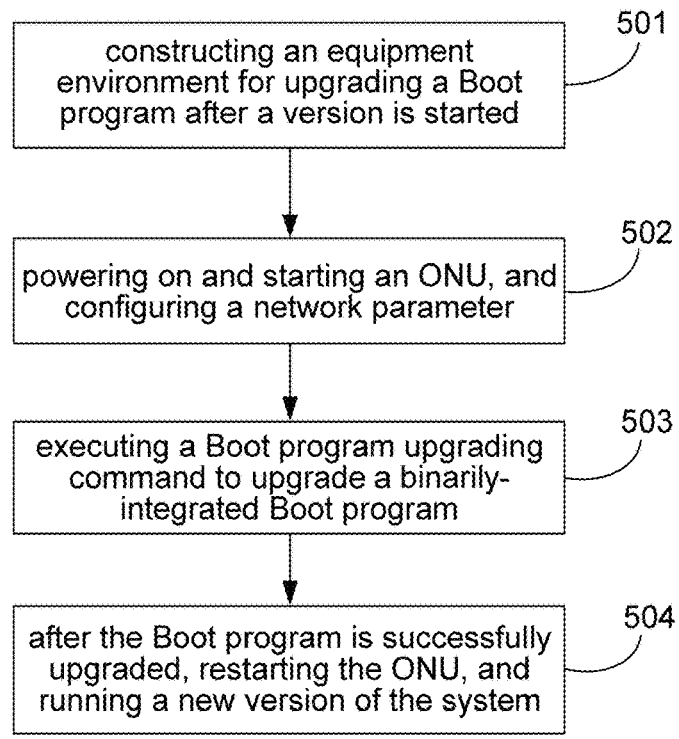
FIG. 5 is a flowchart of an in-band upgrading method for a Boot program according to an embodiment of the disclosure.

FIG. 5 is a flowchart of an in-band upgrading method for a Boot program according to an embodiment of the disclosure, as shown in FIG. 5, the method is implemented by the following flow:

Step 501: constructing an equipment environment for upgrading a Boot program after a version is started.

Specifically, an ONU is connected to a PC through a network cable, a Web-based File Transfer Protocol (WFTP) client is turned on at a PC side, and the Boot program to be upgraded is prepared.

Step 502: powering on and starting the ONU, and configuring a network parameter.

Specifically, the ONU is powered on and started, and remotely logs in master control boards, i.e., control chips, through the PC after the version is started, and the control chips remotely configure an IP address and Virtual Local Area Network (VLAN) parameter of the ONU.

Step 503: executing a Boot program upgrading command to upgrade the binarily-integrated Boot program.

Step 504: after the Boot program is successfully upgraded, restarting the ONU, and running a new version of the system.

Figure 6:
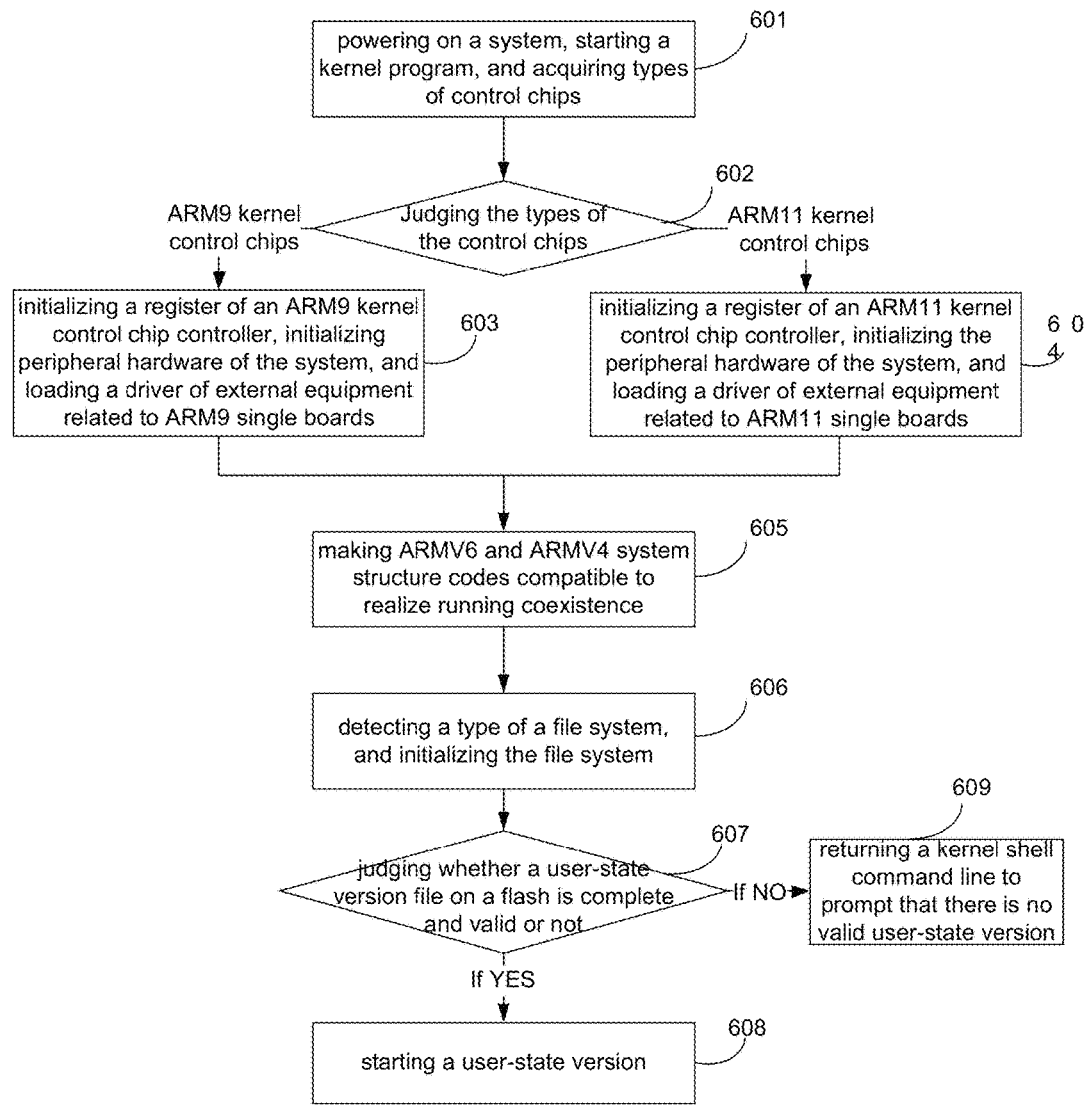
FIG. 6 is an implementation flowchart of a starting method for a kernel program according to an embodiment of the disclosure.

An embodiment of the disclosure further provides a starting method for a kernel program, as shown in FIG. 6, the method is implemented by the following steps:

Step 601: powering on a system, starting a kernel program, and acquiring types of control chips;

Step 602: judging the types of the control chips, and if the control chips are ARM9 kernel control chips, executing step 603, and if the control chips are ARM11 kernel control chips, executing step 604;

Step 603: initializing a register of an ARM9 kernel control chip controller, initializing peripheral hardware of the system, loading a driver of external equipment related to ARM9 single boards, and executing step 605, wherein the peripheral hardware includes: equipment such as a memory, a flash, a network port and a serial port;

Step 604: initializing a register of an ARM11 kernel control chip controller, initializing peripheral hardware of the system, and loading a driver of external equipment related to ARM11 single boards, wherein the peripheral hardware includes: equipment such as a memory, a flash, a network port and a serial port;

Step 605: making ARMV6 and ARMV4 system structure codes compatible to realize running coexistence;

Step 606: detecting a type of a file system, namely: detecting the type of the file system on the flash, and initializing the file system;

Step 607: judging whether a user-state version file on the flash is complete and valid or not, mainly checking a mask, size, checksum and the like of a main program, if yes, executing step 608, otherwise turning to step 609;

Step 608: starting a user-state version; and

Step 609: returning a kernel shell command line to prompt that there is no valid user-state version.

Preferably, one embodiment of the disclosure further includes an upgrading method for a kernel program, including: upgrading under a Boot command line and in-band upgrading, i.e., remote upgrading performed through a network management after the version is started.

Figure 7:
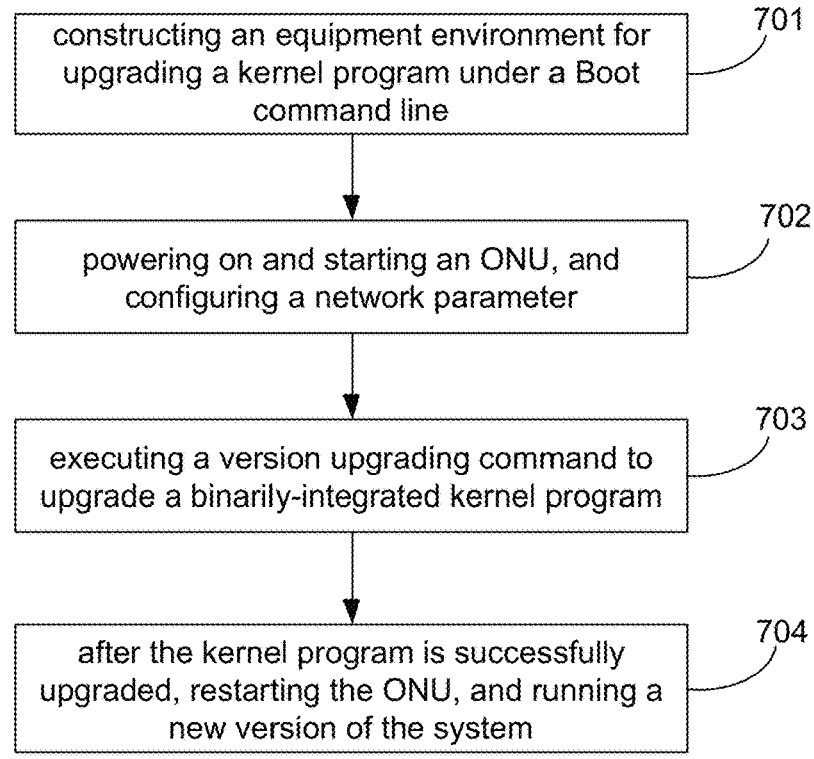
FIG. 7 is a flowchart of an upgrading method for a kernel program under a Boot command line according to an embodiment of the disclosure.

FIG. 7 is a flowchart of an upgrading method for a kernel program under a Boot command line according to an embodiment of the disclosure, as shown in FIG. 7, the method is implemented by the following flow:

Step 701: constructing an equipment environment for upgrading a kernel program under a Boot command line.

Specifically, an ONU is connected to a PC through a network cable and a serial port cable, a TFTP client is turned on at a PC side, and the binarily-integrated kernel program to be upgraded is prepared.

Step 702: powering on and starting an ONU, and configuring a network parameter.

Specifically, the ONU is powered on and started, an ENTER key is pressed in a Boot process to enter the Boot command line, a c command is input, and IP addresses of an ONU side and a TFTP server side are configured in the same network segment.

Step 703: executing a version upgrading command to upgrade a binarily-integrated kernel program, namely to upgrade a binarily-integrated version program.

Step 704: after the kernel program is successfully upgraded, restarting the ONU, and running a new version of the system.

Figure 8:
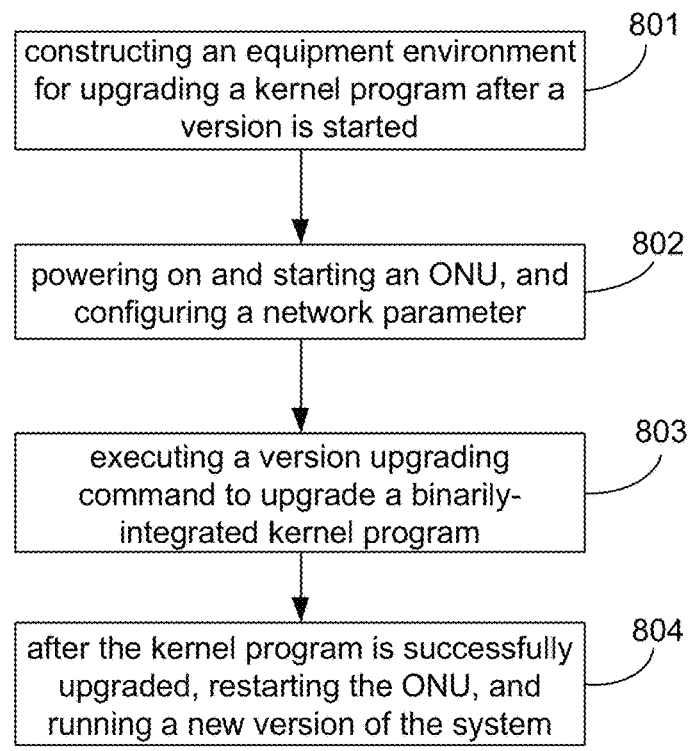
FIG. 8 is a flowchart of an in-band upgrading method for a kernel program according to an embodiment of the disclosure.

FIG. 8 is a flowchart of an in-band upgrading method for a kernel program according to an embodiment of the disclosure, as shown in FIG. 8, the method is implemented by the following flow:

Step 801: constructing an equipment environment for upgrading a kernel program after a version is started.

Specifically, an ONU is connected to a PC through a network cable, a WFTP client is turned on at a PC side, and the binarily-integrated kernel program to be upgraded is prepared.

Step 802: powering on and starting an ONU, and configuring a network parameter.

Specifically, the ONU is powered on and started, and remotely logs in master control boards, i.e., control chips, through the PC after the version is started, and the control chips remotely configure an IP address and VLAN parameter of the ONU.

Step 803: executing a version upgrading command to upgrade a binarily-integrated kernel program, namely to upgrade a binarily-integrated version program.

Step 804: after the kernel program is successfully upgraded, restarting the ONU, and running a new version of the system.

According to the embodiment of the disclosure, use of the same software version for two different control chips may be realized without additional hardware cost, and high transplantability is achieved.

In addition, according to the embodiment of the disclosure, in an upgrading process of the Boot program and the kernel program, one version may be upgraded to two different control chips, so that convenience is brought to external field upgrading and version management, version upgrading efficiency and stability are both greatly improved, use is facilitated, and maintenance cost of the system is lowered.

The above are only preferred embodiments of the disclosure and not intended to limit the scope of protection of the disclosure.

What is claimed is:

1. A setting method for binary integration of a Boot program and a kernel program, comprising:
    performing unified configuration on configuration files of different control chips, identifying the control chips according to hardware information, and modifying code flows of different control chips to implement the binary integration of the Boot program; and
    unifying kernel configurations of different control chips, and performing compiling coexistence configuration and running coexistence configuration on different control chips to implement the binary integration of the kernel program;
    wherein the performing compiling coexistence configuration comprises: integrating (a) Board Support Package (BSP) code(s) of one or more control chips into a BSP of one control chip by virtue of a same set of configuration;
    a starting method for a binarily-integrated kernel or Boot program, which comprises:
    powering on a system, starting the kernel or Boot program, and acquiring types of the control chips;
    judging the types of the control chips, if the control chips are Advanced Risc Machine 9 (ARM9) kernel control chips, the initializing a register of an ARM9 kernel control chip controller, initializing peripheral hardware of the system, and loading a driver of external equipment related to ARM9 single boards; if the control chips are Advanced Risc Machine 11 (ARM11) kernel control chips, then initializing a register of an ARM11 kernel control chip controller, initializing the peripheral hardware of the system, and loading a driver of external equipment related to ARM11 single boards;
    making ARM Version 6 (ARMV6) and ARM Version 4 (ARMV4) system structure codes compatible to realize running coexistence;
    detecting a type of a file system, and initializing the file system; and
    judging whether a user-state version file or a version file on a flash is complete and valid or not, if yes, then starting a user-state version or a main version of the system; otherwise, returning a kernel shell command line or a Boot command line to prompt that there is no valid user-state version or no version file.

2. The setting method for the binary integration of the Boot program and the kernel program according to claim 1, wherein the performing unified configuration on configuration files of different control chips comprises:
    setting conflicting macros of different control chips into global variables respectively, setting conflicting items corresponding to all the macros in a control chip initialization process, and sequentially modifying locations using the conflicting items.

3. The setting method for the binary integration of the Boot program and the kernel program according to claim 1, wherein the hardware information comprises: General Purpose Input/output (GPIO) interface information or processor type information.

4. The setting method for the binary integration of the Boot program and the kernel program according to claim 1, further comprising:
    an upgrading method for a binarily-integrated Boot program, which comprises: upgrading under a Boot command line and in-band upgrading,
    wherein the in-band upgrading comprises: performing remote upgrading through a network manager after the version is started.

5. The setting method for the binary integration of the Boot program and the kernel program according to claim 4, wherein the upgrading for the Boot program under the Boot command line comprises:
    constructing an equipment environment for upgrading the Boot program under the Boot command line; powering on and starting an Optical Network Unit (ONU), and configuring a network parameter; executing an updating command to upgrade a binarily-integrated Boot program; after the Boot program is successfully upgraded, restarting the ONU, and running a new version of the system.

6. The setting method for the binary integration of the Boot program and the kernel program according to claim 4, wherein the in-band upgrading for the Boot program comprises:
    constructing an equipment environment for upgrading the Boot program after a version is started; powering on and starting an ONU, and configuring a network parameter; executing a Boot program upgrading command to upgrade a binarily-integrated Boot program; after the Boot program is successfully upgraded, restarting the ONU, and running a new version of the system.

7. The setting method for the binary integration of the Boot program and the kernel program according to claim 1, further comprising: an upgrading method for a binarily-integrated kernel program, which comprises: upgrading under a Boot command line and in-band upgrading.

8. The setting method for the binary integration of the Boot program and the kernel program according to claim 7, wherein the upgrading for the kernel program under the Boot command line comprises:
    constructing an equipment environment for upgrading the kernel program under the Boot command line; powering on and starting an ONU, and configuring a network parameter; executing a version upgrading command to upgrade the binarily-integrated kernel program; after the kernel program is successfully upgraded, restarting the ONU, and running a new version of the system.

9. The setting method for the binary integration of the Boot program and the kernel program according to claim 7, wherein the in-band upgrading for the kernel program comprises:
    constructing an equipment environment for upgrading the kernel program after a version is started; powering on and starting an ONU, and configuring a network parameter; executing a version upgrading command to upgrade the binarily-integrated kernel program; after the kernel program is successfully upgraded, restarting the ONU, and running a new version of the system.

10. The setting method for the binary integration of the Boot program and the kernel program according to claim 2, wherein the conflicting items for different control chips include: a memory base address, a memory size, a flash base address, a flash size, and a base address of external equipment.

11. The setting method for the binary integration of the Boot program and the kernel program according to claim 1, wherein the Boot program comprises: a version header and a version main body;
   wherein the version header further comprises: a version number, a version function, a version type, creation time of a version, a length of the version header, a size of the version, a checksum of the version header, Boot mask information and preservation information; wherein the version function refers to a type of the control chip, and the version type indicates that the program is a Boot program; and
   wherein the version main body is a Boot version mirror; and the Boot version mirror refers to a valid code of the Boot program.

12. The setting method for the binary integration of the Boot program and the kernel program according to claim 1, wherein the unifying kernel configurations of different control chips comprises: compiling mirrors capable of running normally on different control chips by virtue of a same set of configuration.

13. The setting method for the binary integration of the Boot program and the kernel program according to claim 1, wherein the running coexistence configuration refers to unification of instructions of processors in different versions;
   wherein the performing running coexistence configuration comprises: extracting codes including instructions of a processor in a high version, and compiling the codes by using the instructions of the processor in the high version.

14. The setting method for the binary integration of the Boot program and the kernel program according to claim 1, wherein the peripheral hardware comprises: a memory, a flash, a network port and a serial port.

15. The setting method for the binary integration of the Boot program and the kernel program according to claim 1, further comprising: after implementing the binary integration of the kernel program, compiling a binary integration of the system by using the binary integration of the kernel program and a user-state code.

* * * * *